United States Patent
Heurlin et al.

(10) Patent No.: US 9,061,642 B2
(45) Date of Patent: Jun. 23, 2015

(54) PASSENGER AIRBAG SWITCH

(71) Applicant: VOLVO CAR CORPORATION, Gothenburg (SE)

(72) Inventors: Fredrik Heurlin, Torslanda (SE); Johan Persson, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 0 days.

(21) Appl. No.: 14/064,549

(22) Filed: Oct. 28, 2013

(65) Prior Publication Data
US 2014/0136022 A1 May 15, 2014

(30) Foreign Application Priority Data
Nov. 15, 2012 (EP) .................................... 12192763

(51) Int. Cl.
*B60R 21/01* (2006.01)
*B60R 21/015* (2006.01)
*G06F 19/00* (2011.01)

(52) U.S. Cl.
CPC ............................. *B60R 21/01564* (2014.10)

(58) Field of Classification Search
CPC B60R 21/01; B60R 21/01564; B60R 21/015; B60R 21/0136; B60R 21/0153; B60R 21/32; G06F 17/00; G06F 19/00; B60K 28/10
USPC ................ 701/2, 45; 340/5.61, 933; 280/735; 180/274; 307/10.1
See application file for complete search history.

(56) References Cited

U.S. PATENT DOCUMENTS

| | | |
|---|---|---|
| 5,892,433 A | 4/1999 | Fulda |
| 6,145,874 A | 11/2000 | Modzelewski et al. |
| 6,148,874 A | 11/2000 | Rutter et al. |
| 6,224,095 B1 * | 5/2001 | Schifflechner et al. ....... 280/735 |
| 6,910,711 B1 * | 6/2005 | Breed et al. .................... 280/735 |
| 2007/0100525 A1 * | 5/2007 | Mattes et al. .................... 701/45 |
| 2008/0236275 A1 * | 10/2008 | Breed et al. ................. 73/290 V |
| 2011/0148574 A1 * | 6/2011 | Simon et al. ................. 340/5.61 |
| 2011/0209551 A1 * | 9/2011 | Helldorfer et al. .............. 73/658 |
| 2012/0318646 A1 * | 12/2012 | Lanter et al. ........... 200/61.58 B |

FOREIGN PATENT DOCUMENTS

| | | |
|---|---|---|
| DE | 19541998 | 5/1997 |
| DE | 102004048806 | 4/2006 |
| EP | 0891899 | 1/1999 |

OTHER PUBLICATIONS

Extended European Search Report for EP 12192763.6, Completed by the European Patent Office on Apr. 26, 2013, 6 Pages.
European Search Report; Related Case EP12192763.6, Filed Nov. 15, 2011; Date of mailing Nov. 7, 2014.

* cited by examiner

*Primary Examiner* — Tan Q Nguyen
(74) *Attorney, Agent, or Firm* — Brooks Kushman P.C.

(57) ABSTRACT

A passenger airbag system includes a control unit connected to a switch for switching a passenger airbag between an active and a non-active state. The system also includes a first radio frequency unit arranged in the vehicle and may include a second radio frequency unit arranged in a vehicle remote key, so that when the radio frequency units are brought in contact with each other one of the units is arranged for sending a signal to the control unit for changing a setting of the switch.

20 Claims, 2 Drawing Sheets

PASSENGER AIRBAG SWITCH

CROSS-REFERENCE TO RELATED APPLICATIONS

This application claims priority to European Patent Application No. 12192763.6 filed Nov. 15, 2012, the disclosure of which is hereby incorporated in its entirety by reference herein.

TECHNICAL FIELD

The present disclosure relates to a passenger airbag system comprising a control unit connected to a switch for switching the passenger airbag between an active and a non-active state.

BACKGROUND

Advanced airbag technologies are being developed to tailor airbag deployment to the severity of the crash, the size and posture of the vehicle occupant, belt usage, and how close that person is to the actual airbag. Many of these systems use multi-stage inflators that deploy less forcefully in stages in moderate crashes than in very severe crashes. Occupant sensing devices let the airbag control unit know if someone is occupying a seat adjacent to an airbag, the mass/weight of the person, whether a seat belt or child restraint is being used, and whether the person is forward in the seat and close to the airbag. Based on this information and crash severity information, the airbag is deployed at either a high force level, a less forceful level, or not at all.

Adaptive airbag systems may utilize multi-stage airbags to adjust the pressure within the airbag. The greater the pressure within the airbag, the more force the airbag will exert on the occupants as they come in contact with it. These adjustments allow the system to deploy the airbag with a moderate force for most collisions; reserving the maximum force airbag only for the severest of collisions. Additional sensors to determine the location, weight or relative size of the occupants may also be used. Information regarding the occupants and the severity of the crash are used by the airbag control unit, to determine whether airbags should be suppressed or deployed, and if so, at various output levels.

There are also several solutions available for handling the presence of a child seat turned backwards in the front passenger seat. These systems are generally complicated and many users would like to have a better control of the status. Thus, it is still desired to have a more manual switching. The most common ones are lock shaped, i.e. with a slot in them such that for instance the vehicle key can be inserted in the slot and then turned. The slot then usually points towards "on" or "off".

SUMMARY

The object of the present disclosure is to provide a passenger airbag switch which is easy to use and has a low cost.

This object is achieved by the passenger airbag system as set forth in the appended claims.

According to the present disclosure a passenger airbag system comprises a control unit connected to a switch for switching the passenger airbag between an active and a non-active state. The system further comprises a first radio frequency unit arranged in the vehicle and a second radio frequency unit arranged in a vehicle remote key arranged such that when said radio frequency units are brought into contact with each other one of the units is arranged to send a signal to the control unit for changing the setting of the switch. With the system of the present disclosure the number of mechanical- and moving parts is reduced. Also, with prior art solutions the user needs to produce a key blade or similar to change the setting. The development is going more a more towards keys without key blades. The expression "in contact" is in the context of the application not limited to the physical meaning that the devices are brought into contact with each other but is also meant to encompass for instance that the device are close enough to each other to get into "radio contact" with each other.

According to another aspect of the present disclosure the system further comprises a console with the vehicle radio frequency unit arranged in it.

According to another aspect of the present disclosure the system further comprises a switch status indicator. For safety reasons, an indicator may be provided for facilitating the use. If a vehicle is used temporarily by another driver the information about the current passenger airbag status might not be known. The indicator may comprise some kind of light, such as the indicator comprising an LED. Low power consuming parts are desirable in vehicles to keep down the fuel consumption.

For easy access to the information as to whether or not the passenger airbag is active the system could according to one aspect of the present disclosure comprise an overhead console indication.

According to a further aspect of the present disclosure the first radio frequency unit is arranged on the side of the dashboard on the passenger side such that unit is only accessible when the passenger vehicle door is open. With this arrangement it is easy to change the status simultaneously as arranging or removing a child seat in the passenger seat.

According to yet another aspect of the present disclosure an acoustic signal indicates a status switch. In bright light it might sometimes be difficult to see whether a lamp is lit or not. By producing an acoustic signal upon the change of status, the user gets a better confirmation. Also, a further development of this is to have one type of acoustic signal when activating the airbag and another one when the airbag is deactivated.

The first radio frequency unit arranged in the vehicle is according to one embodiment of the present disclosure a passive unit and the second radio frequency unit arranged in the vehicle remote key is an active unit. Thus, the vehicle remote key identifies the passive unit if close enough and transmits a signal to the switch in order to have the status changed.

The first radio frequency unit arranged in the vehicle is according to another embodiment an active unit and the second radio frequency unit arranged in the vehicle remote key is a passive unit. A receiver recognises in this case the presence of the remote key with the passive unit and a transmitter connected to the receiver sends a signal to the switch in order to have the status changed.

BRIEF DESCRIPTION OF THE DRAWINGS

The disclosure will now be further discussed with reference to the accompanying drawings.

DETAILED DESCRIPTION

As required, detailed embodiments are disclosed herein. However, it is to be understood that the disclosed embodiments are merely exemplary, and the present disclosure may be embodied in various and alternative forms. The figures are not necessarily to scale. Some features may be exaggerated or minimized to show details of particular components. Therefore, specific structural and functional details disclosed herein are not to be interpreted as limiting, but merely as a representative basis for teaching one skilled in the art.

Figure 1:
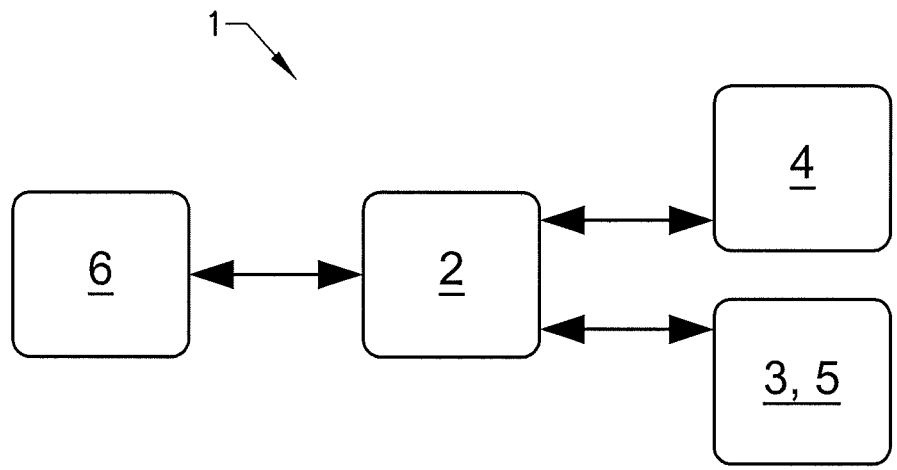
FIG. 1 is a block diagram of an embodiment of the disclosure.

A passenger airbag system 1 according to an embodiment of the present disclosure is shown schematically in a block diagram in FIG. 1. A control unit 2 is connected to a switch 3 for switching the passenger airbag 6 between an active and a non-active state. The system 1 also comprises a first radio frequency unit arranged in the vehicle and a second radio frequency unit arranged in a vehicle remote key arranged such that when said radio frequency units are brought in contact with each other one of the units is arranged to send a signal to the control unit 2 for changing the setting of the switch 3. When the key remote is placed on the console the sensor toggles the switch 3 and sends switch status information to the vehicle supplemental restraint system, i.e. the control unit 2. The control unit 2 thus activates or deactivates the passenger airbag 6 and also sends the airbag status information to the overhead console 4 in order to activate ON or OFF lamps on the overhead console 4. Apart from sending status information to the overhead console 4, the control unit 2 also sends status information to the passenger airbag cut off switch console 3 where the ON or OFF lamp is activated on the switch status indicator 5.

The control unit, which may also be referred to as an electronic control unit (ECU) or controller, may include a microprocessor, microcontroller, programmable digital signal processor (DSP) or another programmable device. The control unit may also, or instead, include an application specific integrated circuit (ASIC), a programmable gate array or programmable array logic, a programmable logic device, or a digital signal processor (DSP). Where the control unit includes a programmable device such as a microprocessor, microcontroller or programmable digital signal processor, the control unit may further include computer executable code that controls operation of the programmable device.

The vehicle radio frequency unit may be arranged in the passenger cut off switch console 3 which also in an embodiment comprises the switch status indicator 5.

Figure 2:
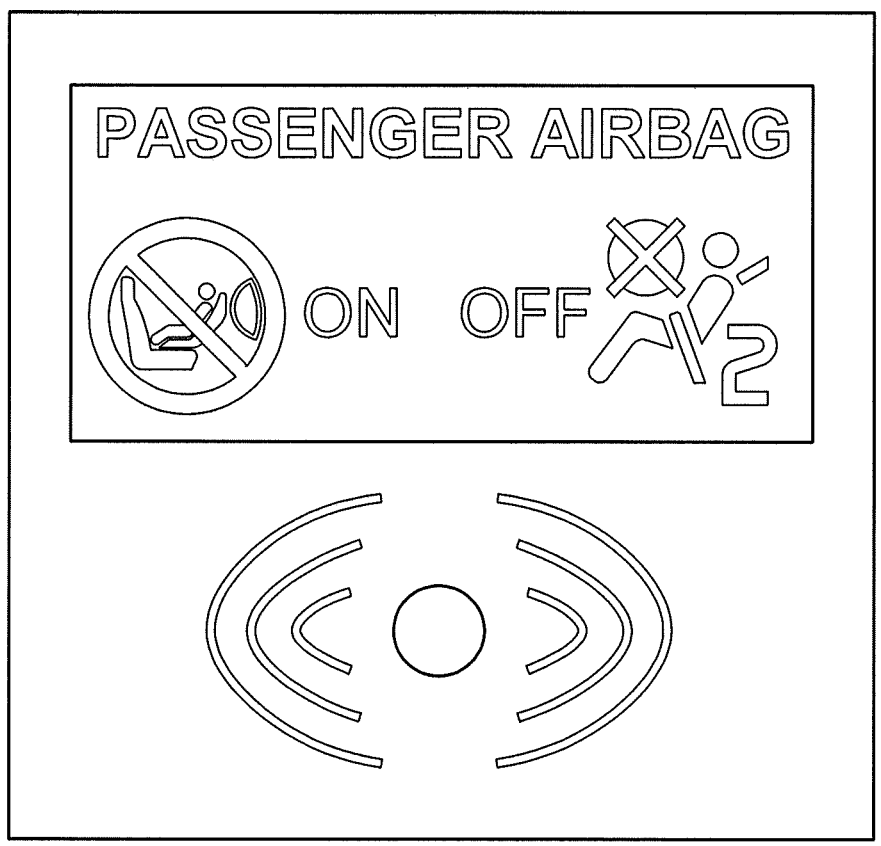
FIG. 2 shows an embodiment of the passenger airbag cut off switch console.

In FIG. 2 is shown an example of a passenger airbag cut of switch console. In the figure the symbols for both the ON and OFF statuses are shown. However, when in use, the symbol saying the passenger airbag is ON is only shown when the airbag is activated, i.e. the left symbol in the figure showing a warning for placing a child seat in the backwards direction. When it is safe to place a child seat in the passenger seat the right hand side symbol is shown instead, i.e. the symbol showing an adult with a crossed out "airbag" in front. Also, in FIG. 2 can be seen an area below the two symbols described above indicating where to put the vehicle remote key for switching/changing the status of the passenger airbag. An example could be that the remote key be held against this area for a few seconds until the other symbol is lit up. Indicator 5 may comprise an LED in order to save energy and thus minimize fuel consumption.

Figure 3:
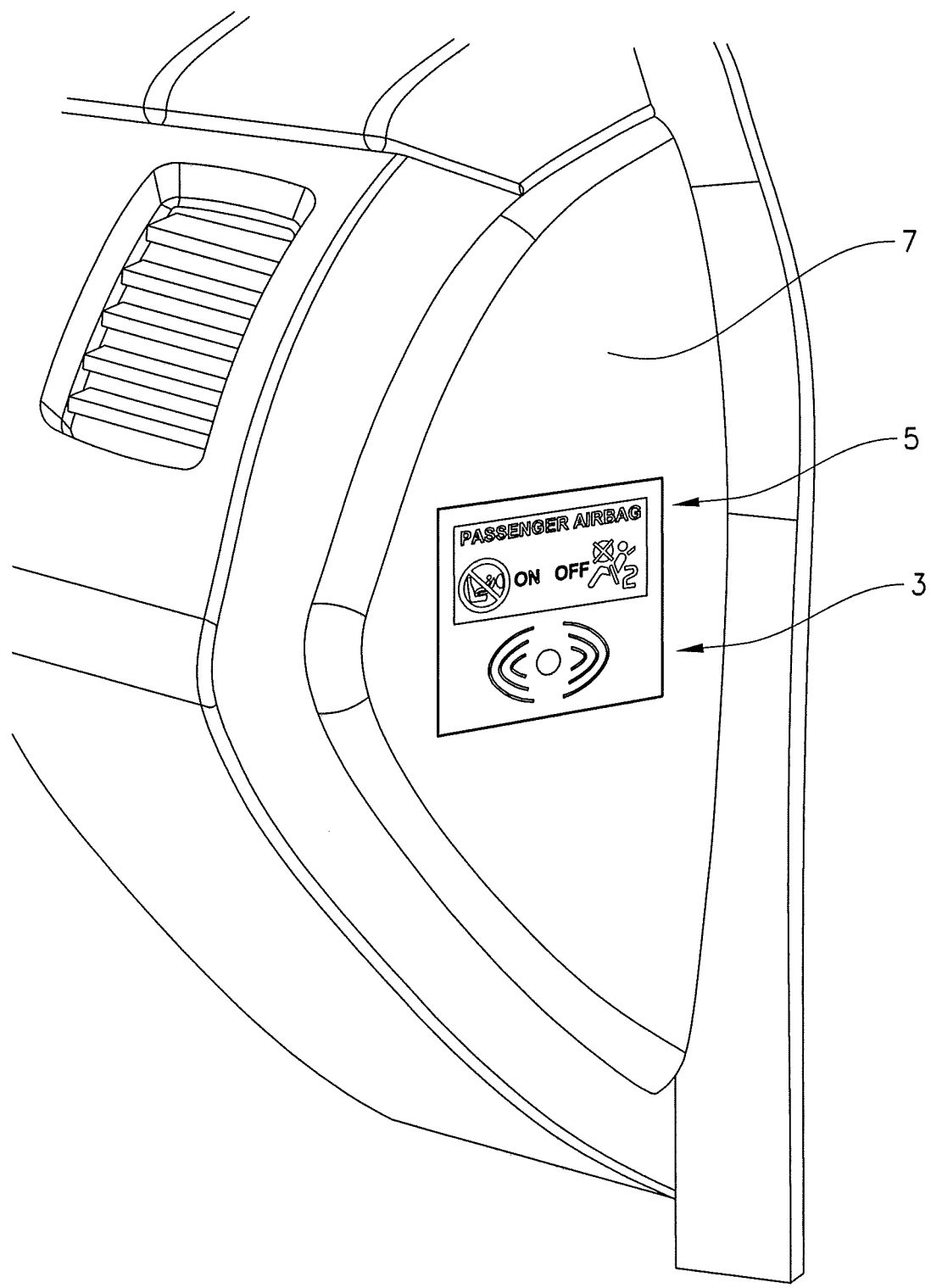
FIG. 3 shows the console of FIG. 2 arranged on the dashboard of a vehicle.

Further, in FIG. 3 is shown how the first radio frequency unit 3 is arranged on the side of the dashboard 7 on the passenger side such that the unit is only accessible when the passenger vehicle door is open. In one embodiment the status indicator 5 is only lit up when the passenger door is open since the passenger airbag cut off switch console 3, 5 is otherwise not visible. This could easily be controlled in the same way as the passenger compartment light.

The foregoing is a disclosure of an example practicing the present disclosure. However, it is apparent that method incorporating modifications and variations will be obvious to one skilled in the art. Inasmuch as the foregoing disclosure is intended to enable one skilled in the art to practice the instant disclosure, it should not be construed to be limited thereby, but should be construed to include such modifications and variations as fall within the scope of the claims. For instance, the passenger airbag cut off switch console could be arranged anywhere in the vehicle such as for instance on the driver's side. However, for practical reasons it is better to have it on the passenger side.

Further, the present system could be combined with an automatic child seat sensor such that the user is warned if the passenger airbag is activated when a child seat is arranged in the passenger seat.

For the case when the first radio frequency unit arranged in the vehicle is an active unit and the second radio frequency unit arranged in the vehicle remote key is a passive unit, there are two options. One is that the entire key code is used and the other where just a part or parts of the key code is/are used.

Also, as described above, according to one aspect of the present disclosure the first radio frequency unit could be arranged on the side of the dashboard on the passenger side such that unit is only accessible when the passenger vehicle door is open. However, there are of course other positions in the vehicle that might be equally suitable for placing the first radio frequency unit.

While exemplary embodiments are described above, it is not intended that these embodiments describe all those possible. Rather, the words used in the specification are words of description rather than limitation, and it is understood that various changes may be made without departing from the present disclosure. Additionally, the features of various implementing embodiments may be combined to form further embodiments of the invention.

What is claimed is:

1. A passenger airbag system comprising:
   a control unit;
   a switch for connection to the control unit, the switch for switching a passenger airbag between an active and a non-active state;
   a first radio frequency unit for arrangement in a vehicle;
   a second radio frequency unit for arrangement in a vehicle remote key, wherein when said radio frequency units are brought in contact with each other, one of the units is configured for sending a signal to the control unit for changing a setting of the switch; and
   a component having an area indicating where the second radio frequency unit is to be positioned for changing the state of the passenger airbag switch so that when the second radio frequency unit is positioned against the area, the setting of the switch is changed.

2. A passenger airbag system according to claim 1, further comprising a console with the vehicle radio frequency unit for arrangement in the console.

3. A passenger airbag system according to claim 1, further comprising a switch status indicator.

4. A passenger airbag system according to claim 3, wherein the indicator comprises an LED.

5. A passenger airbag system according to claim 1, further comprising an overhead console indication.

6. A passenger airbag system according to claim 1, wherein the first radio frequency unit is for arrangement on a side of a dashboard on a passenger side such that the unit is only accessible when a passenger vehicle door is open.

7. A passenger airbag system according to claim 1, wherein an acoustic signal indicates a status switch.

8. A passenger airbag system according to claim 1, wherein the first radio frequency unit for arrangement in the vehicle is a passive unit and the second radio frequency unit for arrangement in the vehicle remote key is an active unit.

9. A passenger airbag system according to claim 1, wherein the first radio frequency unit for arrangement in the vehicle is an active unit and the second radio frequency unit for arrangement in the vehicle remote key is a passive unit.

10. A vehicle comprising the passenger airbag system of claim 1.

11. A passenger airbag system comprising:
a control unit;
a switch for connection to the control unit, the switch for switching a passenger airbag between an active and a non-active state; and
a first radio frequency unit for arrangement in a vehicle;
wherein when said first radio frequency unit is brought in contact with a second radio frequency unit arranged in a vehicle remote key, one of the units is configured for sending a signal to the control unit for changing a setting of the switch, and wherein the vehicle includes a component having an area indicating where the second radio frequency unit is to be positioned for changing the state of the passenger airbag switch so that when the second radio frequency unit is positioned against the area, the setting of the switch is changed.

12. A passenger airbag system according to claim 11, further comprising a console with the vehicle radio frequency unit for arrangement in the console.

13. A passenger airbag system according to claim 11, further comprising a switch status indicator.

14. A passenger airbag system according to claim 13, wherein the indicator comprises an LED.

15. A passenger airbag system according to claim 11, further comprising an overhead console indication.

16. A passenger airbag system according to claim 11, wherein the first radio frequency unit is for arrangement on a side of a dashboard on a passenger side such that the unit is only accessible when a passenger vehicle door is open.

17. A passenger airbag system according to claim 11, wherein an acoustic signal indicates a status switch.

18. A passenger airbag system according to claim 11, wherein the first radio frequency unit for arrangement in the vehicle is a passive unit and the second radio frequency unit for arrangement in the vehicle remote key is an active unit.

19. A passenger airbag system according to claim 11, wherein the first radio frequency unit for arrangement in the vehicle is an active unit and the second radio frequency unit for arrangement in the vehicle remote key is a passive unit.

20. A passenger airbag system according to claim 11 wherein the control unit comprises a programmable device.

\* \* \* \* \*